(12) United States Patent
Ehrlich et al.

(10) Patent No.: US 8,884,925 B2
(45) Date of Patent: Nov. 11, 2014

(54) DISPLAY SYSTEM AND METHOD UTILIZING OPTICAL SENSORS

(75) Inventors: Sharon Ehrlich, Petach-Tikva (IL); Raul Farkas, Bat-Yam (IL); Eliezer Polak, Hod-HaSharon (IL)

(73) Assignee: Radion Engineering Co. Ltd., Petach-Tikva (IL)

( * ) Notice: Subject to any disclaimer, the term of this patent is extended or adjusted under 35 U.S.C. 154(b) by 403 days.

(21) Appl. No.: 13/262,943

(22) PCT Filed: Apr. 1, 2010

(86) PCT No.: PCT/IB2010/051439
§ 371 (c)(1),
(2), (4) Date: Oct. 5, 2011

(87) PCT Pub. No.: WO2010/116308
PCT Pub. Date: Oct. 14, 2010

(65) Prior Publication Data
US 2012/0026134 A1 Feb. 2, 2012

Related U.S. Application Data

(60) Provisional application No. 61/166,747, filed on Apr. 5, 2009.

(51) Int. Cl.
*G06F 3/041* (2006.01)
*G06F 3/042* (2006.01)

(52) U.S. Cl.
CPC ............ *G06F 3/0418* (2013.01); *G06F 3/0425* (2013.01)
USPC .......................... 345/175; 345/173; 178/18.09

(58) Field of Classification Search
USPC ................... 345/1.1–1.3, 173–178; 178/18.01–20.04
See application file for complete search history.

(56) References Cited

U.S. PATENT DOCUMENTS 6,906,702 B1 6/2005 Tanaka et al.
2004/0169870 A1 9/2004 Ahmed et al.
(Continued)

FOREIGN PATENT DOCUMENTS

EP 1550940 7/2005
JP 2007-156757 6/2007
(Continued)

OTHER PUBLICATIONS

International Preliminary Report on Patentability Dated Oct. 20, 2011 From the International Bureau of WIPO Re. Application No. PCT/IB2010/051439.
Notification of Office Action Dated Dec. 30, 2013 From the State Intellectual Property Office of the People's Republic of China Re. Application No. 201080024844.X and Its Translation Into English.
(Continued)

*Primary Examiner* — Ryan A Lubit

(57) ABSTRACT

A unified input and display system and method for enabling sensing interferences made by a user (such as touch or hovering) using multiple interference techniques and instruments. One system comprises: a touch screen that enables emitting and guiding light to enable a user to input drawings by physically interfering the light emitted therefrom and displaying of the interference therethrough; a sensing system comprising a multiplicity of optical sensors arranged according to a predefined layout positioned in relation to the touch screen in a manner that allows the sensors to sense light arriving from the touch screen and translate the sensing into frames each including a pixilated image data of the sensed light; and a screen unification module enabling to unify frames sensed by the sensors at a given moment into a single screen reading comprising a unified whole-screen pixilated image data.

20 Claims, 12 Drawing Sheets

(56) References Cited

U.S. PATENT DOCUMENTS

| | | | |
|---|---|---|---|
| 2006/0001650 A1 | 1/2006 | Robbins et al. | |
| 2006/0132463 A1* | 6/2006 | Lee et al. | 345/173 |
| 2006/0279558 A1 | 12/2006 | Van Delden et al. | |
| 2007/0221828 A1 | 9/2007 | Saxena et al. | |
| 2007/0296688 A1* | 12/2007 | Nakamura et al. | 345/102 |
| 2008/0211779 A1 | 9/2008 | Pryor | |
| 2010/0060611 A1* | 3/2010 | Nie | 345/175 |
| 2010/0110027 A1* | 5/2010 | Lipman et al. | 345/173 |
| 2010/0123732 A1* | 5/2010 | Jenks et al. | 345/1.3 |

FOREIGN PATENT DOCUMENTS

| | | |
|---|---|---|
| WO | WO 2007/014293 | 2/2007 |
| WO | WO 2010/116308 | 10/2010 |

OTHER PUBLICATIONS

Communication Pursuant to Rules 70(2) and 70a(2) EPC Dated Oct. 15, 2013 From the European Patent Office Re. Application No. 10761257.4.

Supplementary Partial European Search Report and the European Search Opinion Dated Oct. 1, 2013 From the European Patent Office Re. Application No. 10761257.4.

International Search Report Dated Sep. 8, 2011 From the International Searching Authority Re. Application No. PCT/IB2010/051439.

Invitation Pursuant to Rule 62a(1) EPC and Rule 63(1) EPC Dated Jun. 19, 2013 From the European Patent Office Re. Application No. 10761257.4.

* cited by examiner

DISPLAY SYSTEM AND METHOD UTILIZING OPTICAL SENSORS

RELATED APPLICATIONS

This application is a National Phase of PCT Patent Application No. PCT/IB2010/051439 having International filing date of Apr. 1, 2010, which claims the benefit of priority of U.S. Provisional Patent Application No. 61/166,747 filed on Apr. 5, 2009. The contents of the above applications are all incorporated herein by reference.

BACKGROUND

1. Field of the Invention

The present invention generally relates to input and display systems and more particularly to input and display systems that include touch screens.

2. Discussion of Related Art

Touch screens are input and display devices that enable detecting touch in the display area, so that they operate both as display systems as well as input systems integrated in a single platform. Touch screens are commonly and widely used, for example in automated teller machines (ATMs) enabling the user to select options presented to him through the screen by pressing areas where they are presented.

One problem that occurs is that most touch screen only allow detecting of one touch at a time carried out in one touch point and therefore are limiting to applications requiring multiple simultaneous touch points. Some applications (such as drawing and hand writing related application) require identification of the instrument used to input the drawing/text (e.g. finger, whole hand, stylus, etc.). inputting touch points by hovering (without actually touching the screen surface) may also be problematic in these known touch screen since they require a completely different system for detection, while the hovering input technique may be extremely hygienic and beneficial, especially for touch screen publicly used (such as in ATMs).

There are known touch screens that allow identification of multiple touch points, which allow inputting touch points and drawings by using various inputting instruments such as finger, multiple fingers and styluses, which include invisible conductive lines arranged within the touch screen, where touch is identified by identifying changes in the conductivity and/or changes is signal(s) transmitted through those lines. This method may cause various problems since the conductive lines may change their quality of conducting the signals over time.

BRIEF SUMMARY

According to one aspect of the invention, there is provided a unified input and display system comprising: at least one touch screen that enables emitting and guiding light to enable a user to input drawings by physically interfering the light emitted therefrom and displaying of said interference therethrough; a sensing system comprising a multiplicity of optical sensors arranged according to a predefined layout positioned in relation to the touch screen in a manner that allows the sensors to sense interferences in a light arriving from the touch screen, made by the user, and translate the sensing into frames each including a pixilated image data of the sensed light; and a screen unification module enabling to unify frames sensed by the sensors at a given moment into a single screen reading comprising a unified whole-screen pixilated image data.

According to another aspect of the invention, there is provided a computer implemented method of analyzing sensors data arriving from a multiplicity of sensors that enable sensing light intensity and optical interferences from a touch screen, wherein the touch screen enables emitting light and displaying inputted drawings inputted by a user by physically interfering the emitted light, the method comprising:

providing a layout of the sensors, wherein the layout includes the positioning of each sensor in relation to the other sensors and in relation to the touch screen;

inputting at least one drawing, wherein the user uses at least one interference instrument and at least one inputting technique to input the drawing;

receiving sensors data from each of the sensors, wherein each sensor provides separate pixilated image data, which is a frame indicating respective interference to the emitted light sensed by each sensor in respect to the sensor's location;

unifying the pixilated image data of all frames received from all sensors into a single screen reading including a unified whole-screen pixilated image data.

According to yet another aspect of the invention, there is further provided a complex comprising:

a multiplicity of unified input and display systems, each system comprising:

at least one touch screen that enables emitting and guiding light to enable a user to input drawings by physically interfering the light emitted therefrom and displaying of said interference therethrough;

a sensing system comprising a multiplicity of optical sensors arranged according to a predefined layout positioned in relation to the touch screen in a manner that allows the sensors to sense light arriving from the touch screen and translate the sensing into frames each including a pixilated image data of the sensed light; and a screen unification module enabling to unify frames sensed by the sensors at a given moment into a single screen reading comprising a unified whole-screen pixilated image data, and a multiplicity of chaining mechanisms each enabling to connect two adjacent input and display systems.

Each of the chaining mechanisms may enable identifying the location of unified input and display system it connects, wherein each chaining mechanism may further enable transmitting the location data indicating the relative locations of each two adjacent systems it connects for further processing and operation to allow operating the display according to the relative locations of each screen in the complex. The complex may further be operatively associated with at least one application enabling to display media content in different screens of the complex, where the location of the visual display at any given moment is defined according to the application rules and according to the configuration of the complex.

BRIEF DESCRIPTION OF THE DRAWINGS

The subject matter regarded as the invention will become more clearly understood in light of the ensuing description of embodiments herein, given by way of example and for purposes of illustrative discussion of the present invention only, with reference to the accompanying drawings (Figures, or simply "FIGS."), wherein.

DETAILED DESCRIPTION

Figure 1:
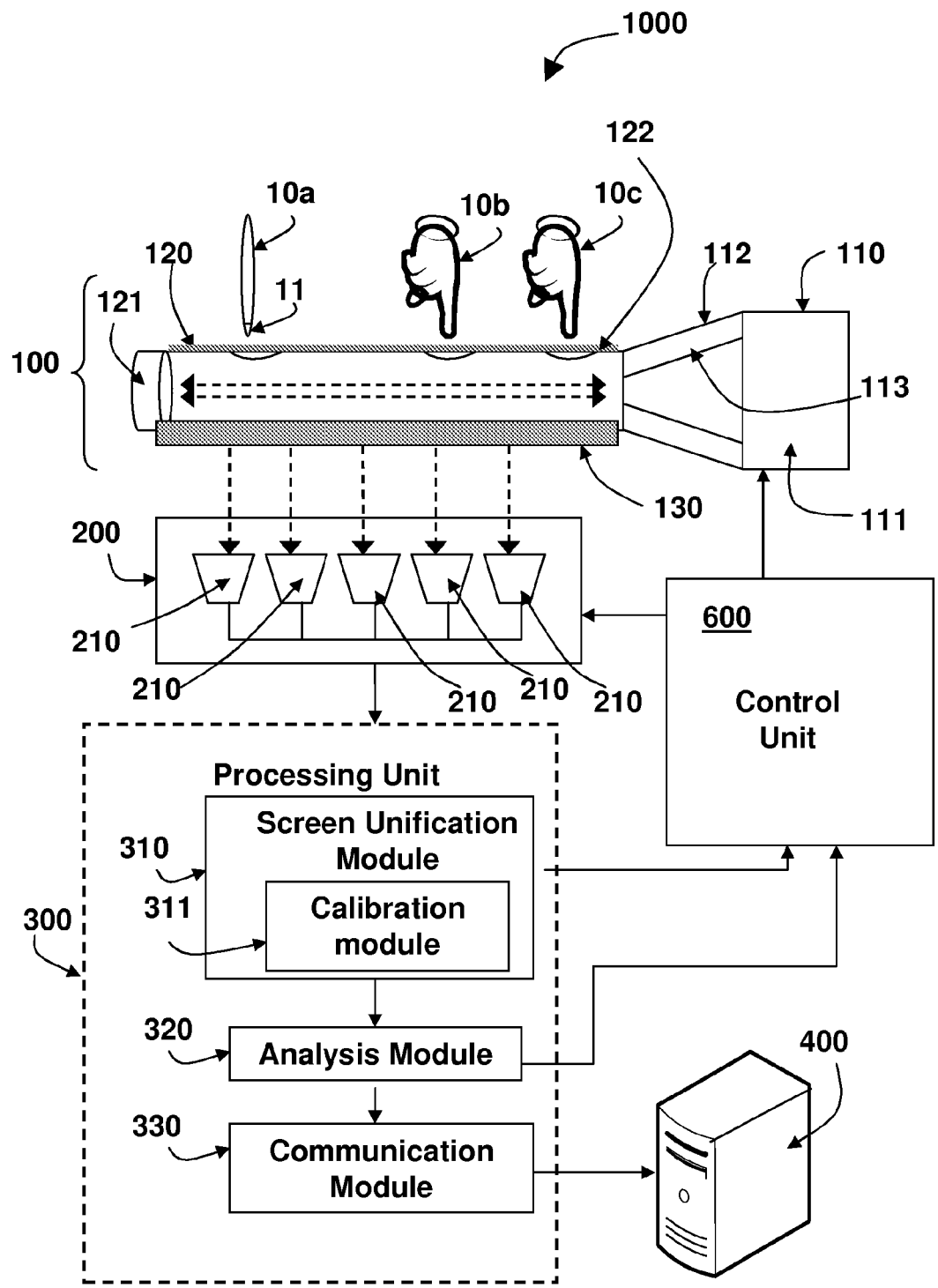
FIG. 1 schematically illustrates a unified input and display system, according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways.

Also, it is to be understood that the phraseology and terminology employed herein is for the purpose of description and should not be regarded as limiting. In other modules, well-known methods, procedures, components and circuits have not been described in detail so as not to obscure the teachings of the present disclosure.

The present invention, in some embodiments thereof, provides input and display system and method allowing a user to input drawings by physically interfering optical light emission from a touch screen (e.g. by writing, sketching, etc.), enabling the user to use multiple interference techniques (e.g. touch by a single finger/multiple fingers/stylus or any other object) and/or multiple interference instruments (e.g. stylus, finger, other objects) and to display the drawn drawing.

Reference is now made to FIG. 1, which schematically illustrates a unified input and display system 1000, according to some embodiments of the invention. The system 1000 may comprise:

at least one touch screen 100 that enables emitting and guiding light to allow a user to input drawings by physically interfering the light emitted therefrom and displaying of the interference therethrough;

a sensing system 200 comprising a multiplicity of optical sensors 210 (such as digital cameras, CCD cameras, or any other optically based acquisition device) arranged according to a predefined layout (e.g. in rows) positioned in relation to the touch screen 100 in a manner that allows the sensors to sense light arriving from the touch screen 100 and translate the sensing into frames each including a pixilated image data of the sensed light;

a processing unit 300 enabling to receive and process the pixilated image data; and a control unit 600 enabling to receive data from the processing unit 300 and control the touch screen 100 and the sensing system 200 according to the received data.

The system 1000 enables the user to use various interference instruments to interfere with the emitted light and various input techniques. For example, the system 1000 may enable detecting whether the user used a stylus 10a, a finger 10b, or any other longitudinal object to input the drawing, whether the user used multiple or a single instrument and the number of instruments used. The technique may also refer to hovering, depending on embodiments of the invention.

According to embodiments, as illustrated in FIG. 1, the processing unit 300 may comprise:

a screen unification module 310 enabling to unify frames sensed by the sensors 210 at a given moment into a single screen reading comprising a unified whole-screen pixilated image data;

an analysis module 320 enabling to receive the unified whole-screen pixilated image data from the screen unification module 310 and analyze the received unified whole-screen pixilated image data to identify touched points made by the user on the touch screen 100, to identify the touch patterns, which indicate the drawing made by the user, and to identify the interference type used by the user to input the drawing (e.g. touch by a single touch instrument; touch by multiple touch instruments, hovering by a stylus, hovering by finger, etc.) and an interference instrument 10a, 10b and/or 10c used to achieve the drawing (e.g. finger, multiple fingers, stylus or any other object enabling to interfere with the emitted light); and a communication module 330 enabling to communicate with at least one terminal 400, where the communication module 330 enables receiving data from the screen unification module 310 and from the analysis module 320 and transmitting the unified whole-screen pixilated image data and the analyzed data to the terminal 400 for further processing of the data and for enabling to operate at least one application according to the transmitted data.

The terminal 400 may be any system known in the art that requires input data from the user such as a gaming system; a computer system; a personal digital assistance (PDA), an application for identifying text and/or for translating hand writing, a processor integrally attached to the input and display system 1000, etc.

The terminal 400 may enable operating upon receiving input of drawing patterns, according to various predefined operation rules. For example, if it is a game drawing a line from left to right may operate a specific function while drawing a rounded figure may be interoperated in a different manner. As another example, if the terminal 400 is a lingual application enabling to receive hand written letters in one or more languages the application may enable operating software codes that enable translating the inputted letters and words and presenting the inputted text in a different location on the same screen.

According to embodiments, as illustrated in FIG. 1, the touch screen may comprise:

a light emission system 110 including at least one light source 111 and at least one collimator 112;

a light guiding layer 120 enabling to substantially homogeneously diffuse light emitted from the light emission system 110 throughout the light guiding layer 120;

a touchable coating layer 122 attached to an external surface of the light guiding layer 120, where the coating layer 122 enables light, diffused by the guiding layer 120, to pass therethrough; and a liquid crystal display (LCD) 130 or any other optical device enabling to display electronic data and drawings, where the LCD 130 is operatively connected to the control unit 600 enabling to control the display by retrieving data from the analysis unit 320 and presenting the drawings patterns identified thereby and/or any other presentation.

According to embodiments, the guiding layer 120 of the touch screen 100 may further include one or more reflectors 121, attached to at least one side surface of the light guiding layer 120 (see FIG. 1), enabling to reflect light arriving from the light emission system 110 back into the guiding layer 120 thereby reducing the losses of emitted light that otherwise could have been emitted to sided of the touch screen 100 that do not direct to the external surface of the guiding layer 120 (for the user to interfere by drawing) or to the side or sides where the sensors 210 are facing for receiving light.

According to embodiments, the optical collimator 112 attached to each light source 111 may have a conical shape where the narrower side of the cone faces the guiding layer 120 and the wider side faces the light source 111. The collimator 112 may include a reflective inner surface 113 (see FIG. 1) enabling to guide or focus light emitted from the light source 111 into the guiding layer 120.

According to embodiments, the light source(s) may include light emitting diode(s) (LED).

The light guiding layer 120 may be made from any light diffusing material known in the art and/or from any light guiding material enabling to guide the light throughout the guiding layer 120, depending on the positioning of the light system 110. The light guiding layer 120 may disperse light throughout the touch screen 100 in a manner that enables at least some of the light to be substantially uniformly dispersed from the guiding layer to the external side of the touch screen 100, so as to allow light to be emitted to the surface of the touch coating layer 122 to allow the user, using a drawing instrument (e.g. 10a, 10b or 10b and 10c), to interfere the light emitted therefrom.

The light source(s) 111 of the light emitting system 110 may be all located at the side of the light guiding layer 120 (as illustrated in FIG. 1) where the sensors 210 may be positioned underneath the touch screen 100 along a plane that is substantially perpendicular to the side of the guiding layer 120 where the at least one light source is located. Alternatively, the light source(s) 111 may be located at the side of the light guiding layer 120 where the sensors 210 may be located in any other one or more other sides of the guiding layer 120 (either perpendicular and/or parallel to the plane where the light sources 111 are located).

The touch coating layer 122 may be made from any material known in the hard that is easy to touch and that can protect the guiding layer 120 with minimal interference to light emitted therefrom (e.g. transparent or semitransparent materials).

According tom some embodiments, the stylus 10a may comprise a reflective portion 11 enabling to reflect light emitted towards the reflective portion 11, when the user uses the stylus 10a to draw upon the coating layer 122 of the touch screen 100 while pointing the reflective portion 11 towards the touch screen 100, as illustrated in FIG. 1.

According to some embodiments, the sensors 210 used in the sensing system 200 may be substantially low-resolution cameras, for example, cameras enabling to produce frames of 640×480 pixels, to lower the price of the system 1000 for the manufacturer and the consumer.

According to some embodiments, as illustrated in FIG. 1, the screen unification module 310 may comprise a calibration module 311 enabling to produce one or more calibration operators, according to which the unification of the screen may be carried out and optionally a signal calibration of each pixel of each camera.

According to some embodiments, the analysis unit 320 may enable identifying the points of touch and possibly the interference instruments by using image analysis that enabling to calculate the interferences' spots sizes (e.g. width), wave interference patterns, and thereby analyze the distance of the interference instrument from the touch coating layer 122 and the instrument type. This can be done even when several instrument of the same or of a different type is used simultaneously when inputting drawings.

According to some embodiments, the unification, analyzing and displaying of the analyzed patterns may be done in near real time to allow the user to view the spots and patterns he/she draws as nearly as possible to the time of inputting the drawing.

Figure 2:
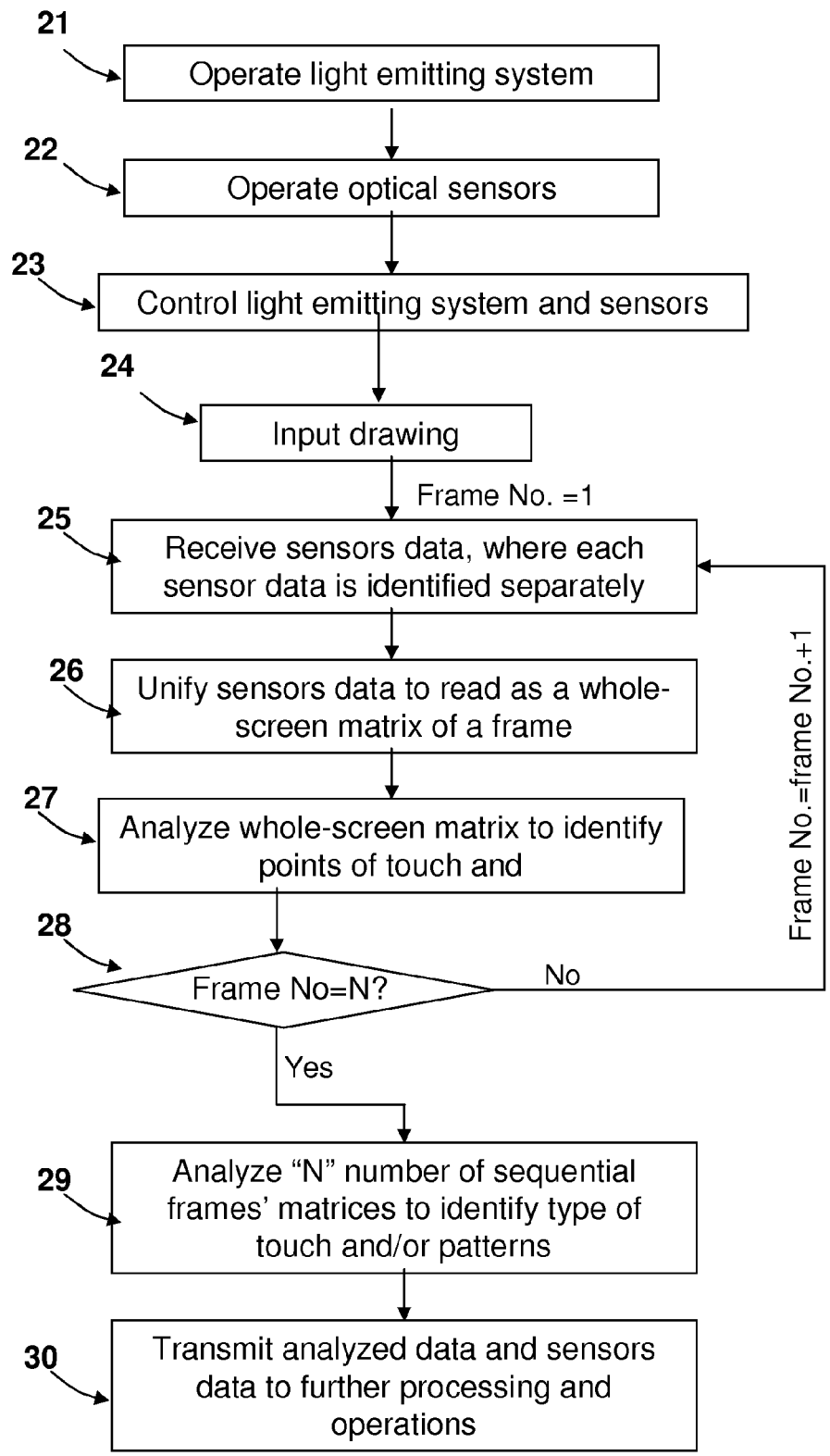
FIG. 2 is a flowchart, schematically illustrating a method of analyzing sensors data arriving from a multiplicity of sensors that enable sensing light intensity and optical interferences from a touch screen of a unified input and display system, according to some embodiments of the invention.

Reference is now made to FIG. 2, which is a flowchart, schematically illustrating a method of analyzing sensors data arriving from a multiplicity of sensors that enable sensing light intensity and optical interferences from a touch screen, where the touch screen enables emitting light and displaying inputted drawings inputted by a user by physically interfering the emitted light, according to some embodiments of the invention, once a layout of the sensors is provided, where the layout includes the positioning of each sensor in relation to the other sensors and in relation to the touch screen. The method may comprise at least some of:

operating light emitting system of the touch screen 21;
operating the sensors 22;
controlling the sensors and the light emission 23;
inputting at least one drawing 24, where the user uses at least one interference instrument and at least one inputting technique to draw upon the touch screen;
receiving sensors data from each of the sensors 25, where each sensor provides separate pixilated image data, which is a frame indicating respective interference to the emitted light sensed by each sensor in respect to the sensor's location;
unifying the pixilated image data of all frames received from all sensors into a single screen reading including a unified whole-screen pixilated image data (e.g. a whole screen matrix) 26;

analyzing the unified whole-screen pixilated image data to identify touched points made by the user on the touch screen 27 (once receiving the unified whole-screen pixilated images);

steps 25-27 may be repeated for each frame of each sensor 28;

analyzing a predefined "N" number of frames, where once the "N" number of frames cycles of all sensors have been analyzed the drawing(s) made by the user may be fully identified as well as the touch type and instrument 29; and transmitting the analyzed data and the unified whole-screen data to at least one terminal for further processing 30.

According to embodiments, each of the pixilated data of each of the frames outputted by each of the sensors 210 may include a matrix of a predefined size. Each pixel represents an intensity value, where each value is positioned in the matrix according to the positioning where the intensity has been sensed by the sensor 210. The unifying of the sensor's data includes unifying the output matrices of all sensors 210 by extracting a relevant matrix part of each matrix and combining the matrices parts into a single unified whole-screen matrix, where the extraction of each matrix part is carried out according to the positioning layout of the sensors 210. The layout may be defined according to an effective field of view of each sensor 210 in relation to the light emitted from the touch screen 100 and the positioning of the sensing system 200 in relation to the touch screen 100.

To extract a relevant matrix part from each sensor 210, a whole screen calibration operator may be produced for all the sensors 210, which is a matrix operator of the same matrix size as that of the whole-screen matrix. The calibration operator may be constructed from smaller sensor operator matrices, each including a sensor calibration matrix of each sensor 210, where the sensors calibration matrices are arranged in the whole-screen calibration matrix according to the positioning of the sensor in the layout. The sensor calibration matrix of each sensor 210 may include zero-values positioned in the matrix according to areas of the sensor 210 where the sensor's effective field of views overlap and non-zero values positioned in the matrix according to areas of the sensor 210 where the sensor's effective field of views do not overlap.

The unification may be carried out by combining the sensor matrices according to the sensors' 210 layout, thereby creating a combined matrix, which is the whole-screen calibration operator, and multiplying each value in the whole-screen calibration matrix with each respective value of the combined matrix producing another mixed matrix in which all the pixels associated with the overlapping areas of the sensors are null. Non-zero values of the mixed matrix are then extracted and arranged in an order that corresponds to their positioning in the mixed matrix creating the unified whole-screen matrix, which represents the unified reading of intensity values of all sensors combined as a single screen reading.

Figure 3:
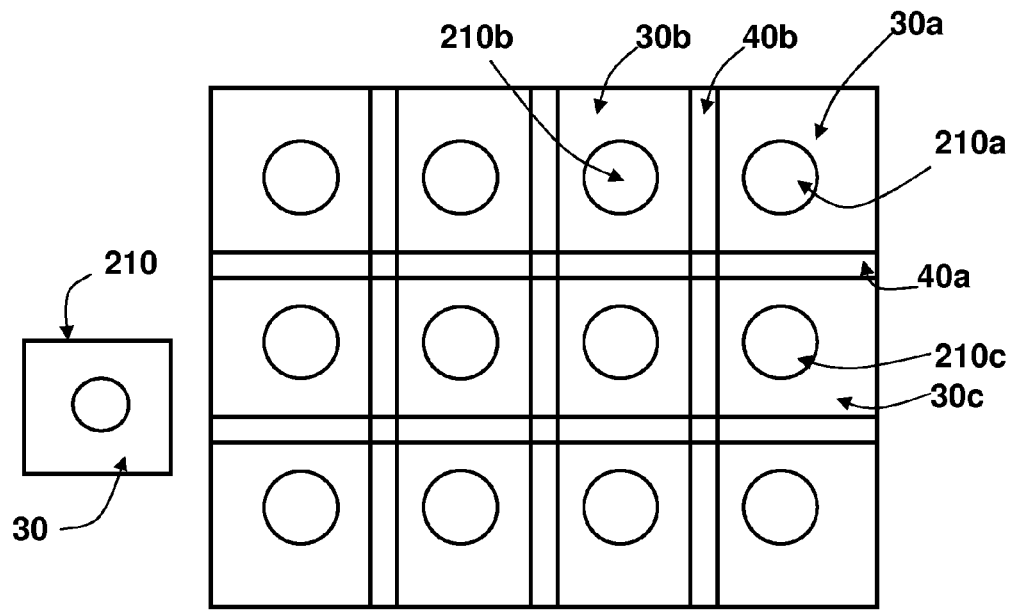
FIG. 3 schematically illustrates a layout of sensors arranged in respect to effective field of view of each sensor in a layout of a sensing system of an input and display system, according to some embodiments of the invention.

Reference is now made to FIG. 3, which schematically illustrates a layout of sensors 210a, 210b, 210c, etc. arranged in respect to the effective field of view 30 of each sensor 210. Each sensor 210 in the layout can overlap with adjacent sensors 210. For example, as illustrated in FIG. 3, sensor 210a is of an effective field of view 30a and is located in a corner of the layout and therefore is adjacent to sensors 210b and 210c of effective fields of view 30b and 30c, respectively, where the overlapping area with the effective field of view of sensor 210b is 40b and the overlapping area with the effective field of view of sensor 210c is 40a. In this example, the sensors 210 are of equal size and have a square or rectangular fields of view. Other sensors 210 in the layout, may overlap with four adjacent sensors 210, depending on their positioning in the layout.

Figure 4A:
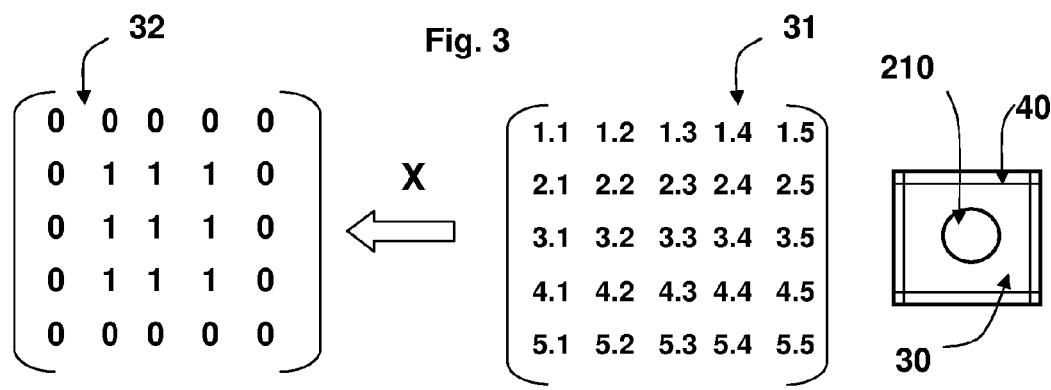
FIG. 4A and FIG. 4B schematically illustrate sensor calibration matrices of a sensor, calculated in relation to the sensor's field of view and in relation to the sensor's overlapping areas in the layout, according to some embodiments of the invention.
Figure 4B:
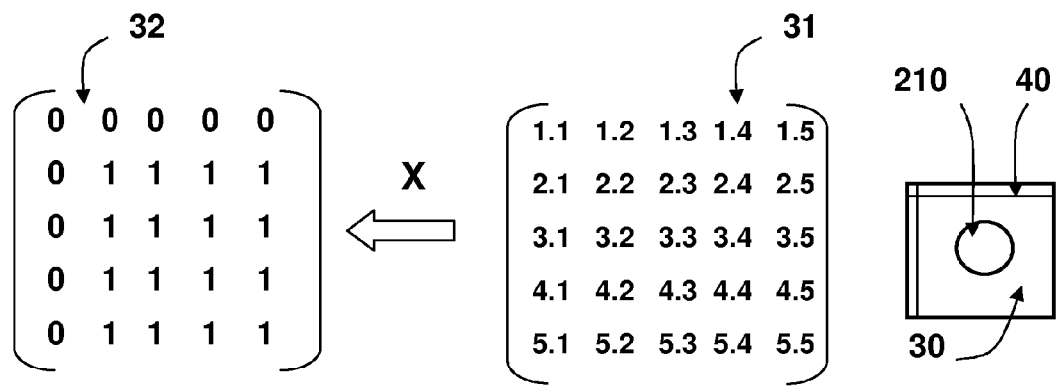

Reference is now made to FIG. 4A and FIG. 4B, which schematically show the sensor calibration matrix calculated to a sensor 210, in relation to the sensor's 210 field of view 30 and in relation to the sensor's 210 overlapping areas 40. FIG. 4A represents a sensor 210 with an approximated rectangular field of view 30 respective to a pixilated sensor matrix 31 output which represents the intensity of light measured in each pixel. The sensor 210, according to its location in respect to other sensors 210 in the layout overlaps with four adjacent sensors 210 and has an overlapping area 40 of one pixel width. This may be translated to a sensor calibration matrix 32, where all framing pixels are null and represented by a zero value, while the other pixels are represented by an integer non-zero value (e.g. "1"). The sensor calibration matrix 32 is of the same size as the output matrix of the sensor 210. This will ensure that by operating scalar product of the sensor matrix 31 with the sensor calibration matrix 32 all overlapping pixels will be zeroed.

Respectively, as illustrated in FIG. 4B, in a case where only some of the borders of the sensor's 210 field of view 30 overlap, the sensor calibration matrix 32 with have respective zeroed pixels.

Figure 4C:
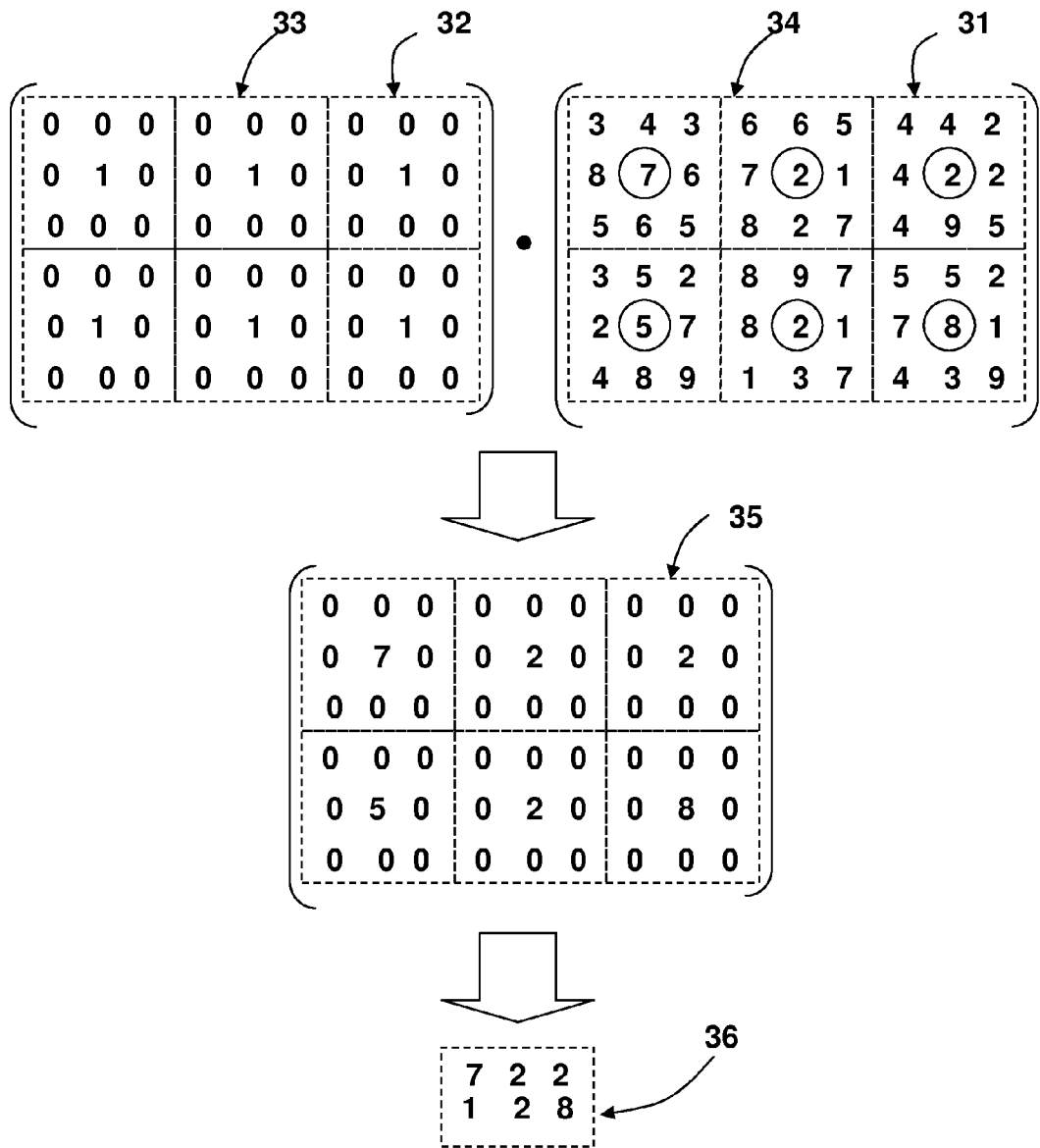
FIG. 4C schematically illustrates the calculations for producing a whole-screen image data matrix, using a whole-screen calibration operator, according to some embodiments of the invention.

Reference is now made to FIG. 4C, which schematically illustrates the construction of a whole-screen calibration operator 33 and the calculating process for producing of a unified whole-screen matrix 36 representing the non-overlapping sensed areas, which represent the entire screen, according to some embodiments of the invention.

As illustrated in FIG. 4C, according to an embodiment in which each sensor outputs a 3×3 sensor matrix 32, the whole-screen calibration operator 33 is constructed by combining the sensors' matrices according to the sensors' 210 location in the layout. The sensors' 210 output matrices may be combined in the same manner into a combined matrix 34 and multiplied (using scalar product multiplication) with the whole-screen calibration operator. This operation may result in a mixed matrix 35, where all the overlapping areas are represented by a zero value and the other non-overlapping areas are represented by non-zero values, which may be equivalent to the measured and/or calculated light intensity. Non-zero values may then be extracted from the mixed matrix 35 and positioned in relation to their location in the mixed matrix 35 once the zero-values are removed. This may result in a reduced matrix, which represents the whole screen reading 36.

Figure 5A:
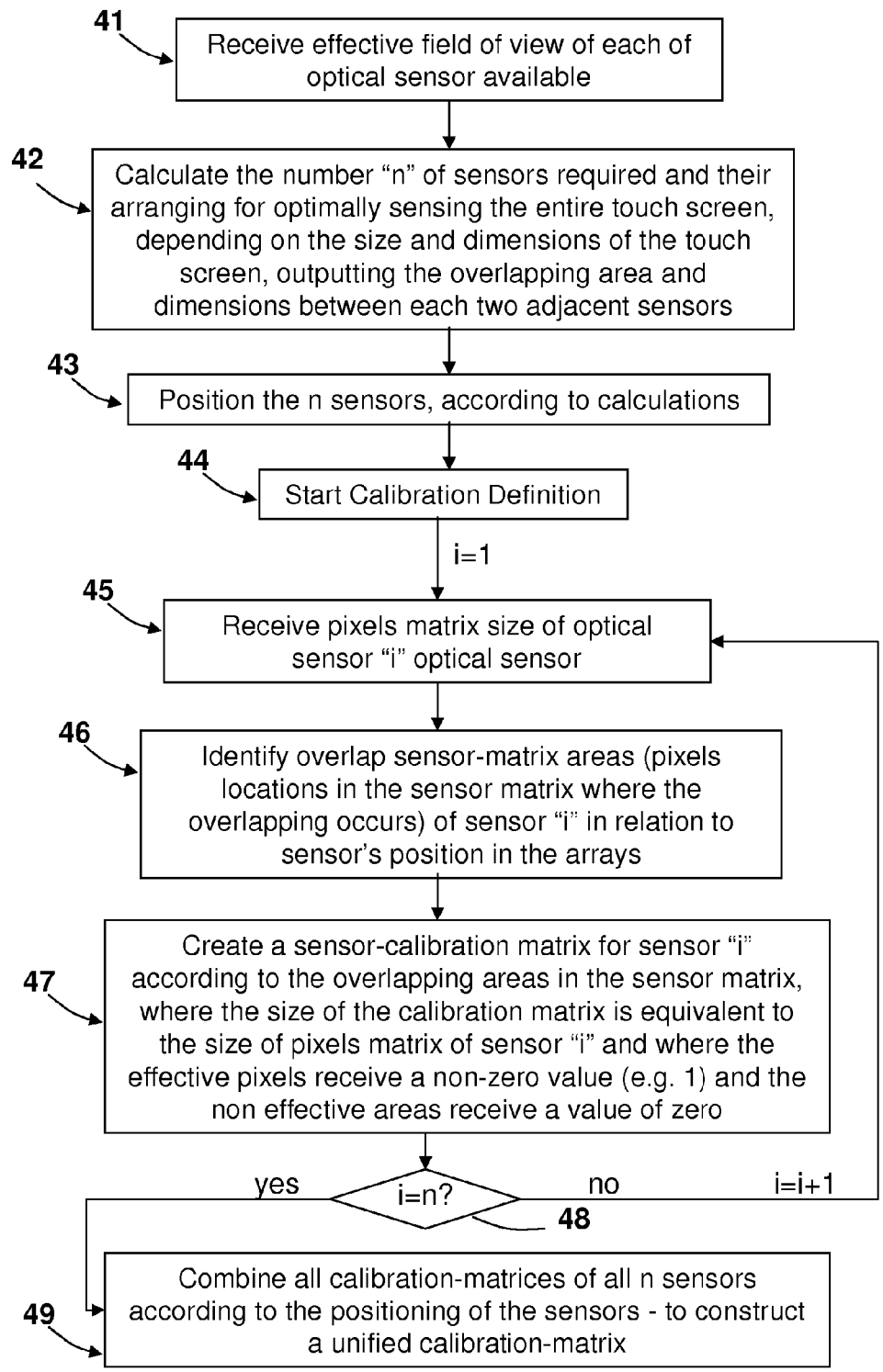
FIG. 5A schematically illustrates a method of producing a whole-screen image data matrix, using a whole-screen calibration operator, according to some embodiments of the invention.

Reference is now made to FIG. 5A, which is a flowchart, schematically illustrating the process of constructing the whole-screen calibration matrix, according to some embodiments of the invention. The process may comprise:

receiving the effective fields of view of available sensors 41;

calculating the number "n" of the sensors required and their arranging (constructing of their layout) for optimally sensing the entire touch screen, depending on the dimensions of the touch screen and the geometrical relation between the sensors and the touch screen 42, where this step may result in outputting of the overlapping areas of each of the sensors;

positioning of the sensors according to the calculated arrangement 43;

starting a calibration construction 44 which will define the whole screen calibration matrix;

receiving sensor matrix size (m×n) of sensor "i" 45;

identifying overlapping sensor-matrix areas (pixels locations in the sensor matrix where the overlapping occurs) for each sensor "i" in relation to the sensor's position in the layout 46 (e.g. by knowing the location of the sensor "i" in relation to other adjacent sensors);

creating a sensor calibration matrix for each sensor "i" according to the identified overlapping areas, where the size of the sensor calibration matrix is equivalent to the size m×n of the sensor matrix 47;

steps 45-47 may be repeated for each sensor of all the "n" sensors 48;

and combining all sensor calibration matrices, according to the layout of the sensors thereby constructing the whole-screen calibration matrix 49 which may then be stored to be used for each sensing session when using the touch screen 100.

An additional calibration may be carried out to the output of each of the sensors to allow substantially optimal reading of the intensity, where each sensor matrix may be calibrated in relation to the intensity representation represented by the pixel representation. This may be advantageous especially when using low-quality (and cheep) sensors 210, to enhancing the resolution of the sensor's output.

Figure 5B:
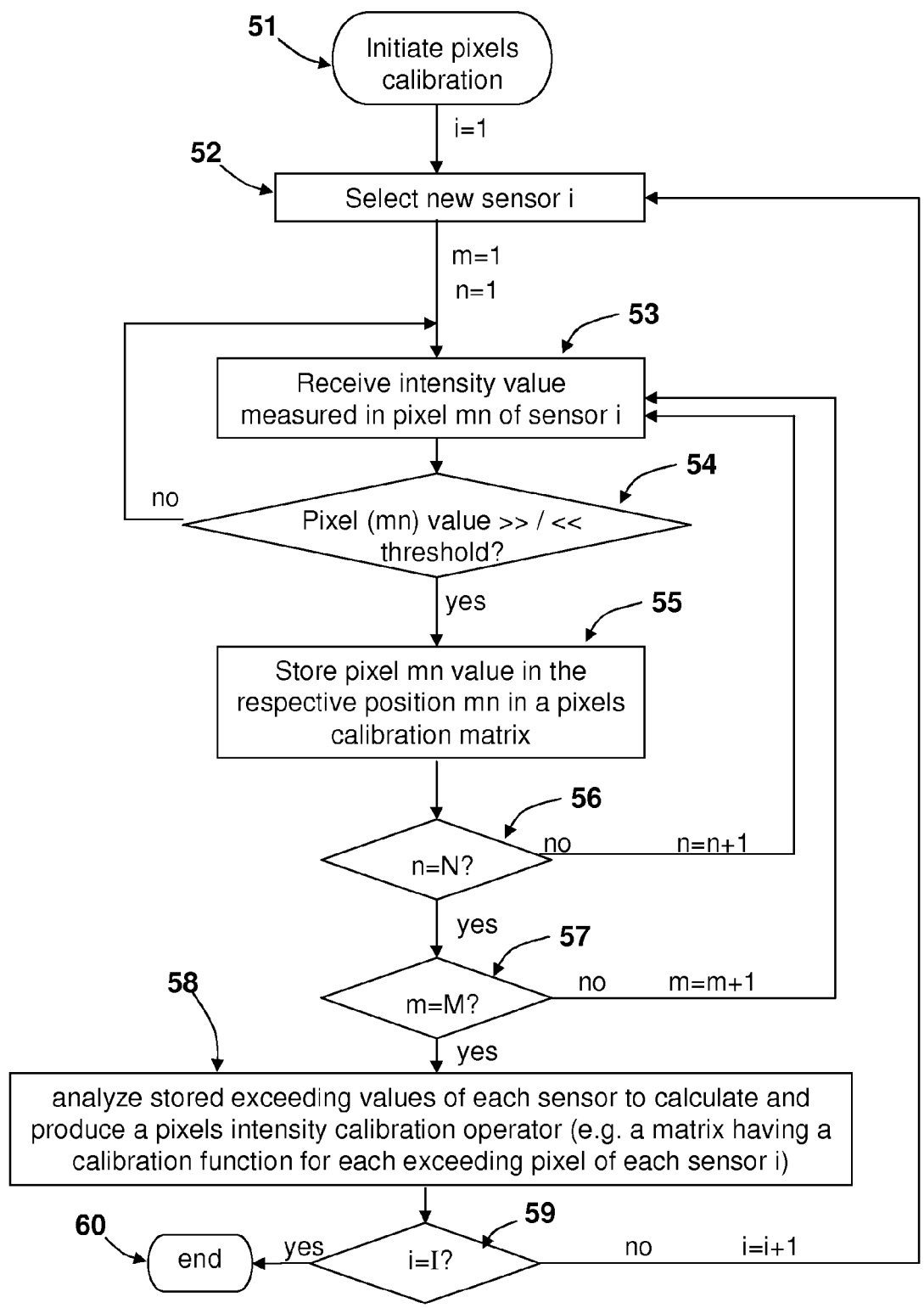
FIG. 5B schematically illustrates a method of producing an intensity calibration operator for sensors of an input and display systems, according to some embodiments of the invention.

Reference is now made to FIG. 5B, which is a flowchart, schematically illustrating a process for producing an intensity calibration matrix for each sensor "i" out of predefined "I" number of sensors in the layout, according to some embodiments of the invention.

The process may include:

initiating intensity calibration of pixels 51;

selecting a new sensor 52;

for each pixel "mn" in the sensor matrix—receiving the measured intensity value of pixel mn of the sensor "i" 53;

the value of the intensity is checked in relation to a predefined threshold value 54;

if the pixel's measured intensity value greatly exceeds the threshold (e.g. much bigger or much smaller—where the relations are predefined (e.g. the absolute value of the difference between the threshold and the measured value should not exceed a predefined delta value))—storing the exceeding value and its respective positioning (mn values) I the sensor matrix and the sensor (i) 55; and this may be carried out for each pixel of each sensor (steps 56-57) of each sensor, where once all exceeding values of a sensor "i" are stored, the stored values are analyze to calculate and produce a pixels intensity calibration operator 58 (e.g. a matrix having a calibration function for each exceeding pixel of each sensor i) of sensor "i" 59-60.

Figure 5C:
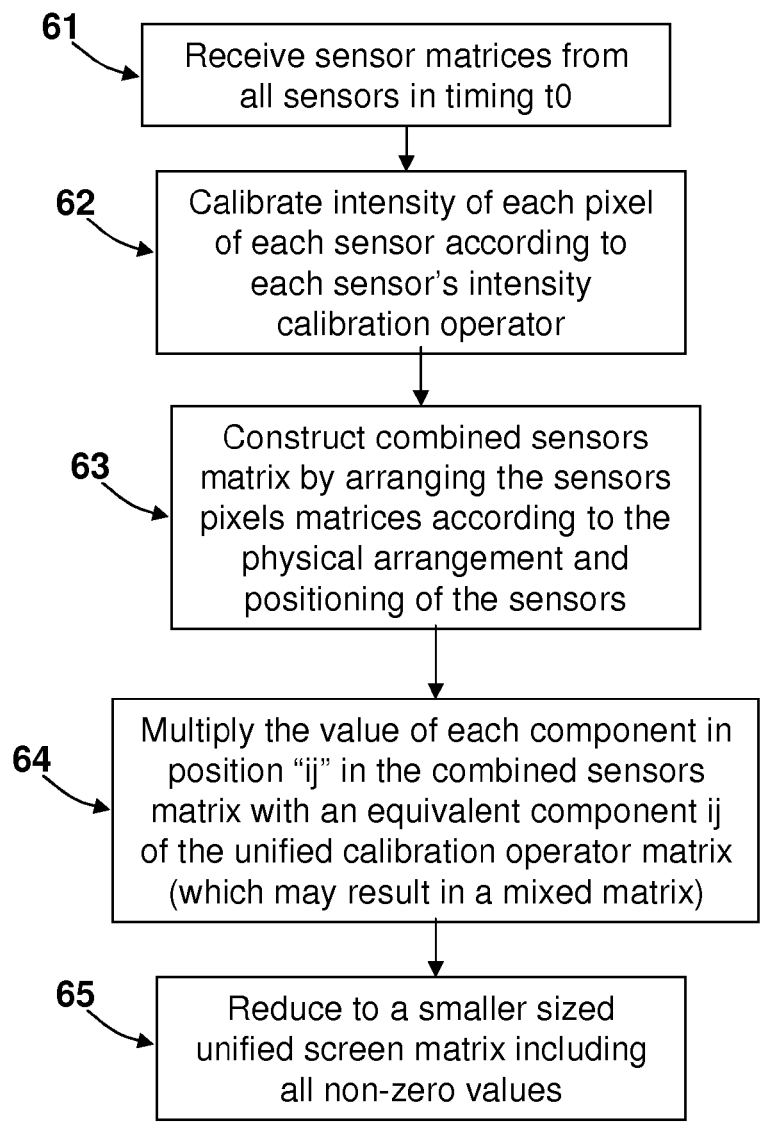
FIG. 5C schematically illustrates a method of producing a whole-screen image data matrix, using the whole-screen calibration operator and the intensity calibration operator, according to some embodiments of the invention.

Reference is now made to FIG. 5C, which is a flowchart, schematically illustrating a method of reading pixilated image data arriving from multiple sensors optically reading in real time from a touch screen, according to some embodiments of the invention. The reading method may include:

receiving sensor matrices from all sensors in timing $t_0$ 61;

calibrating intensity of each pixel of each sensor according to each sensor's intensity calibration operator 62;

constructing a combined sensors matrix by arranging the calibrated sensors pixels matrices according to the physical arrangement and positioning of the sensors 63;

multiplying the value of each component in position "ij" in the combined sensors matrix with an equivalent component ij of the calibration operator matrix 64—which may result in a mixed matrix; and reducing the resulting mixed matrix to a unified whole-screen matrix 65, e.g. by extracting the non-zero values of the mixed matrix and placing the non-zero values in respect to their relative location in the mixed matrix.

The pixels intensity calibration operator may include functions that allow averaging all pixels that exceeded the predefined threshold, enabling to calculate a function for calibrating each exceeding pixel, while memorizing the matrix positioning of each exceeding pixel to produce an intensity calibration operator, enabling to calibrate the pixels of all sensors, when operated upon the sensors pixilated image data.

Figure 6:
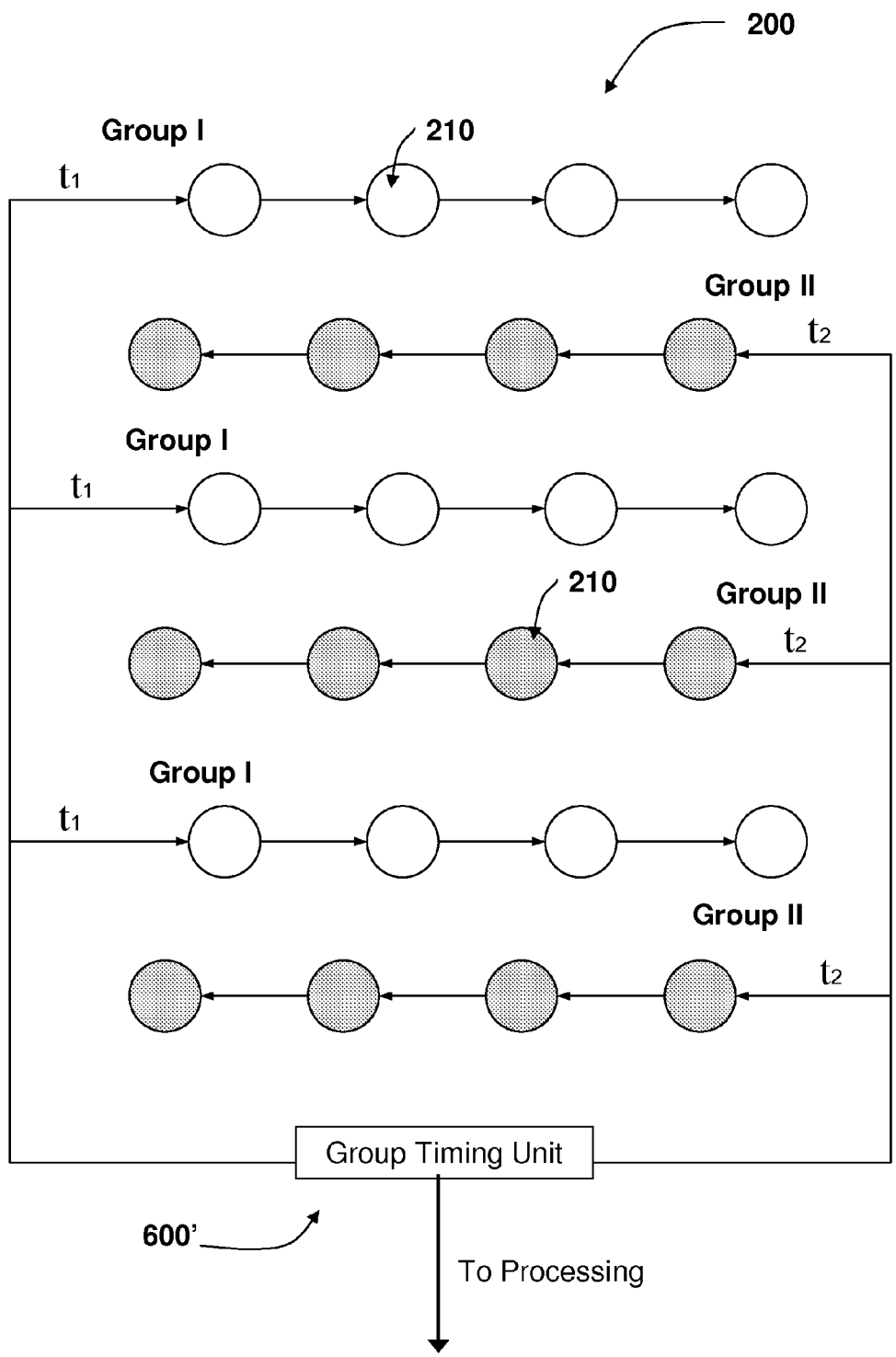
FIG. 6 schematically illustrates a layout of sensors arranged in alternating groups, connected to a group timing unit designed for enhancing sensing frequency resolution, according to some embodiments of the invention.

Reference is now made to FIG. 6, which schematically illustrates a layout of sensors 210 arranged in alternating groups, connected to a group timing unit 600' designed for enhancing sensing resolution of the sensors 210, according to some embodiments of the invention. According to these embodiments, all sensors 210 may have the same low sensing frequency "f", meaning that the sensor 210 acquires a frame image every predefined "t" time-units. The arranging of the sensors 210 may be in groups (e.g. rows), where the sensors 210 of each group may be synchronized to start sensing at a predefined timing. Each group may be set to start sensing at different times so as to enable compensating for the sensors' 210 low frequency and multiply the sensing frequency of the entire sensing system 200.

For example, as illustrated in FIG. 6, groups I and II are arranged in two alternating arrays of sensors 210. The input and display system 1000 may be operatively connected to a group timing unit 600' (e.g. embedded in the control unit 600) enabling to control the sensing timings of all sensors 210 in such a manner that each at least two alternating arrays of sensors 210 begin sensing at different predefined timings: t1 and t2, where t1≠t2, thereby allowing sampling in compensating frequencies shifts (proportional to |t1−t2|), thereby doubling the overall sensing frequency of the sensing system 200.

Figure 7:
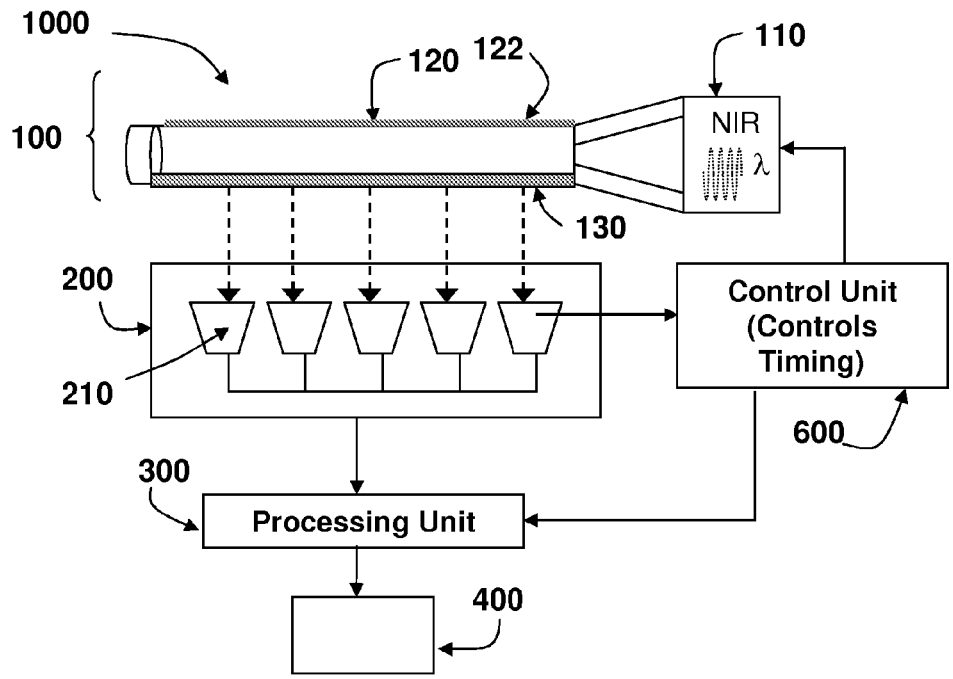
FIG. 7 schematically illustrates an input and display system enabling to sense light of a predefined wavelength band, according to some embodiments of the invention.

Reference is now made to FIG. 7, which schematically illustrates an input and display system 1000 enabling to sense light of a predefined wavelength band, according to some embodiments of the invention. According to these embodiments, light emission system 100 enables emitting light at a predefined wavelength band (E.g. Near Infra Red NIR), where the sensors 210 are adapted to sense light of that band.

Figure 8:
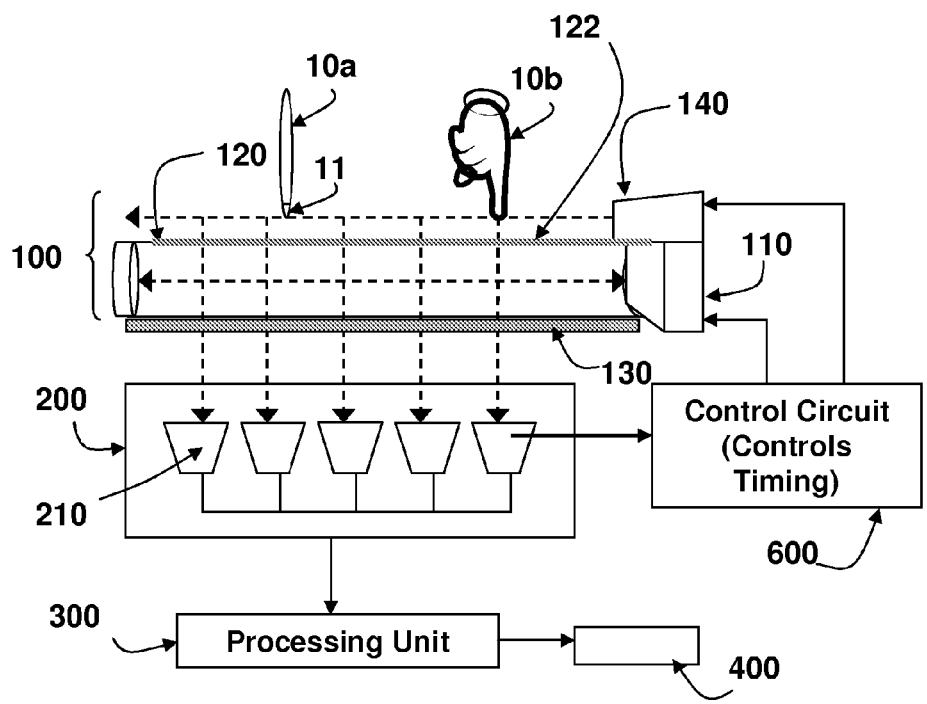
FIG. 8 schematically illustrates an input and display system enabling to sense hovering interferences, according to some embodiments of the invention.

Reference is now made to FIG. 8, which schematically illustrates an input and display system 1000, according to some embodiments of the invention. According to these embodiments, the system 1000 may comprise an additional external light emitting device 140, additionally to the light emitting system 110, where the light emitting device 140 enables emitting and guiding light above the touch screen 100, externally to the touch screen 100 touch coating layer 122, in such a manner that allows the sensors 122 to measure interferences to the light emission that occur above the touch screen 120, within a predefined distance from the touch screen 100, thereby enabling the user to use a hovering inputting technique to input drawings. The interference can be identified by the system 1000 by analyzing the interference patterns to identify whether a direct touch was applied upon the coating layer 122 to carry put the interference or a hovering technique.

The user may be enabled by the system 1000 to use various types of instruments (e.g. finger, stylus, etc.) to draw by hovering around the area where light is emitted by the additional light emitting device 140.

The light emitted from the additional light emitting device 140 may be of a different wavelength band "λ1" than that emitted by the light emission system 110 "λ2" to facilitate the identification of the interference technique.

Figure 9:
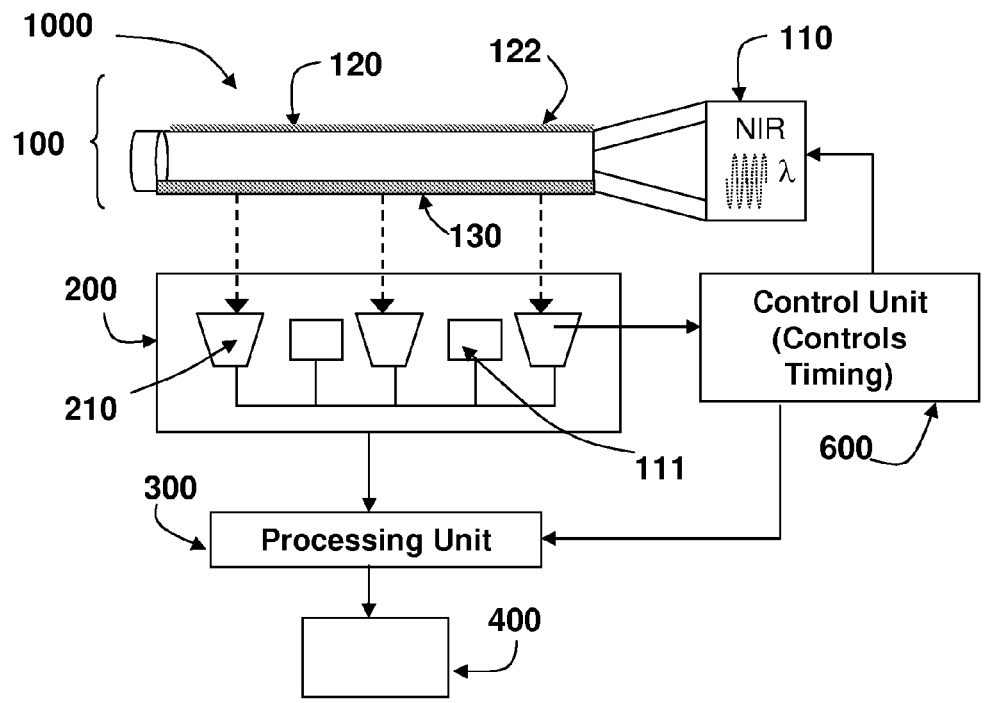
FIG. 9 schematically illustrates a unified input and display system where the light emission system is integrated with the sensing system, according to some embodiments of the invention.

Reference is now made to FIG. 9, schematically illustrating an input and display system 1000, according other embodiments of the invention. According to these embodiments, the light emission system 110 may be integrated within the sensing system 200, where the light sources 111 are entwined between the sensors 210, as illustrated in FIG. 9. In that way the light may be directly emitted upwards in a direction that faces the user and that is perpendicular to the plane of the touch screen 100.

Figure 10:
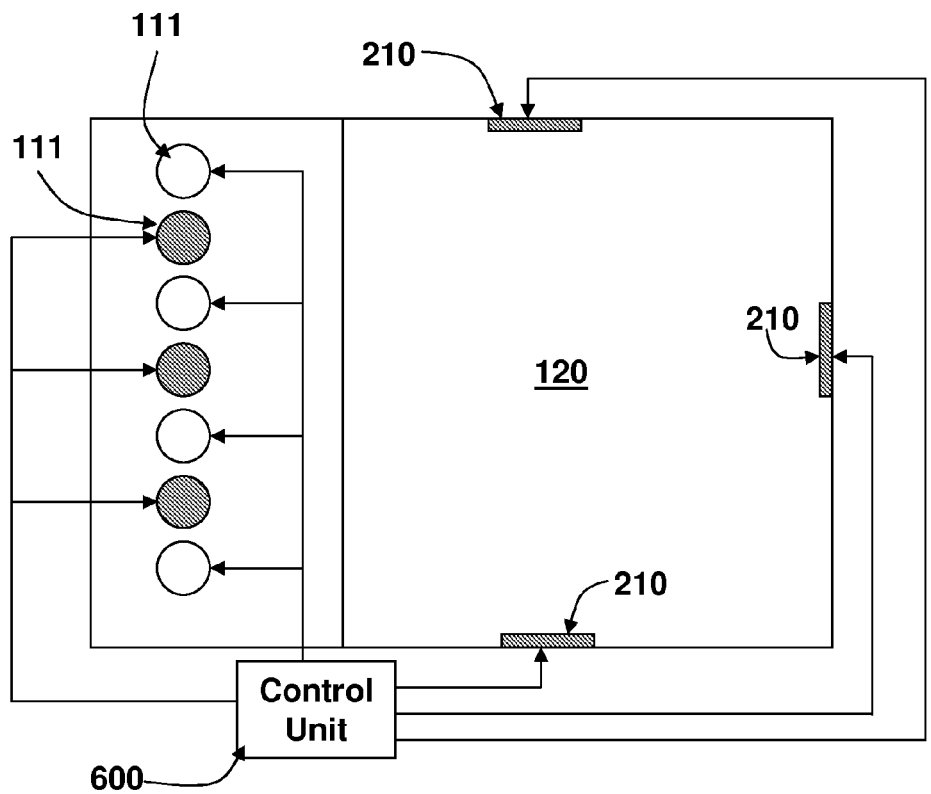
FIG. 10 schematically illustrates a unified input and display system having a backlight lighting, according to some embodiments of the invention.

Reference is now made to FIG. 10, which schematically illustrates an input and display system 1000, according to other embodiments of the invention. According to these embodiments, the light sources 111 are arranged as a backlight system (e.g. where each light source 111 is a LED). The backlight technology enables adapting ready-made lighting platforms according to the size and dimensions of the touch screen 100. This arrangement may also facilitate in esthetically hiding the light emission system 110 and the light sources 111. Additionally, the sensors 210 may be attached to other sides of the touch screen 100 enabling sensing from various angles and positions.

Figure 11:
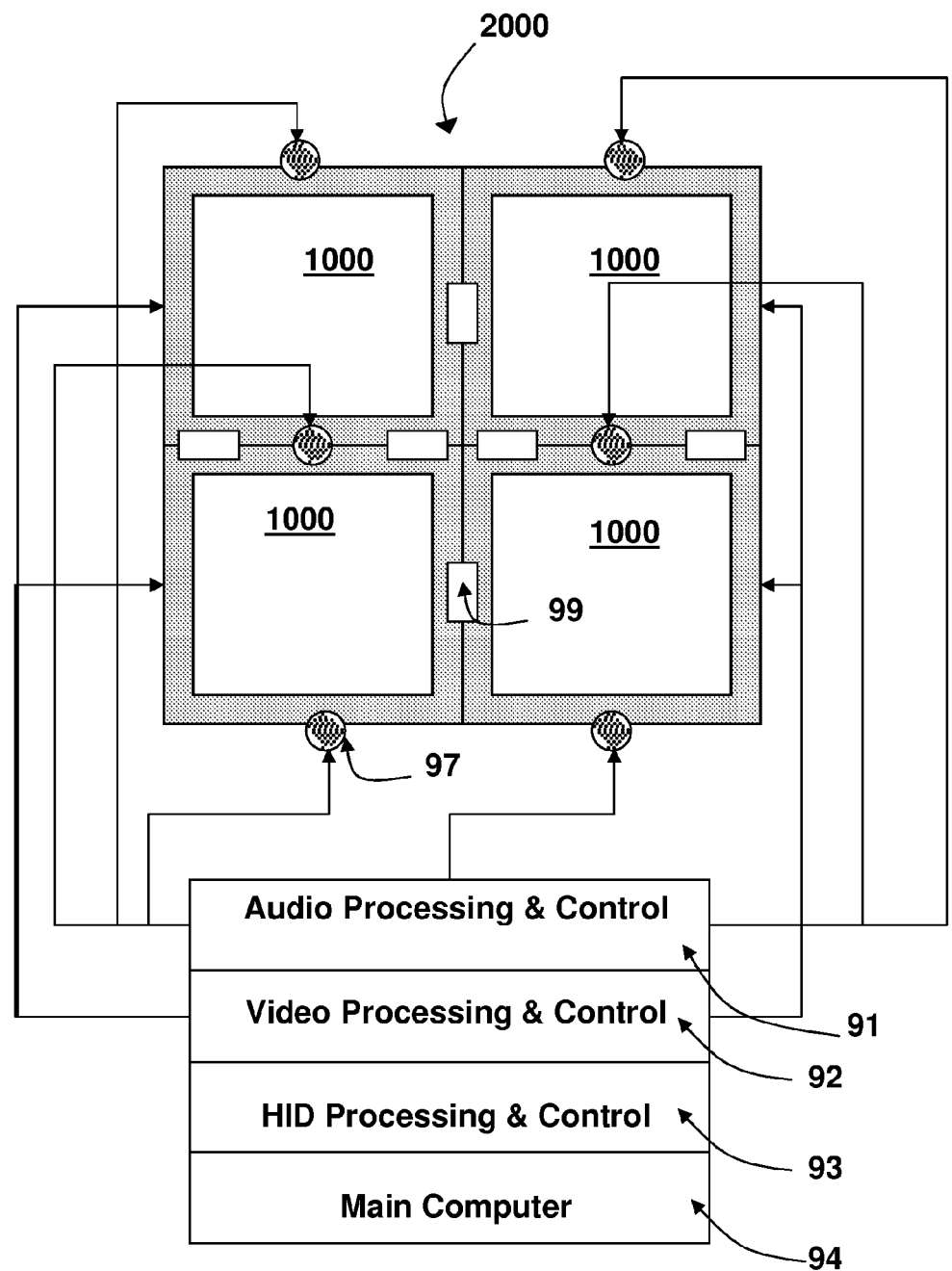
FIG. 11, schematically illustrating a complex comprising multiple input and display systems chained to one another, according to some embodiments of the invention.

Reference is now made to FIG. 11, schematically illustrating a complex 2000 comprising multiple input and display systems 1000 chained to one another to construct a multiple touch screens 100 complex 2000, according to some embodiments of the invention.

The complex 2000 may comprise the multiple input and display systems 1000 and multiple chaining mechanisms 99 enabling to physically connect the unified input and display systems 1000 to one another as well as to identify the location of each unified input and display system 1000 in relation to each at least one other unified input and display system 1000 connected thereby. Each chaining mechanism 99 may further enable transmitting the location data indicating the relative locations of each two adjacent systems 1000 it connects for further processing and operation in an audio and/or video processing and control units 91 and 92 respectively to allow operating the display according to the relative locations of each screen in the complex 2000, top allow one or more applications to display content and/or media presentations in the complex 2000 as if it was a single screen and/or to allow creating effects related to the locations and number of the systems 1000, according to predefined rules involving the location data of the systems 1000.

The complex 2000 may further be operatively associated with additional applications, terminals, and/or human interface devices (HID) 93 or computerized systems 94 for further operations and processing.

Additionally, as illustrated in FIG. 11, multiple speakers 97 may be installed between each two adjacent systems 1000 and/or at the systems 1000 enabling receiving audio signals from a remote application and producing audio sounds accordingly. According to some embodiments of the invention, the application operating the speakers 97, and the providing of the locations of the speakers 97 in relation to the systems 1000 may enable operating the speakers 97 according to the system 1000 that is operated and displaying at any given moment, thereby enabling various audio-visual effects that move sound playing location along with the moving of the visual display between the screens 100 of the systems 1000 in the complex 2000.

Figure 12:
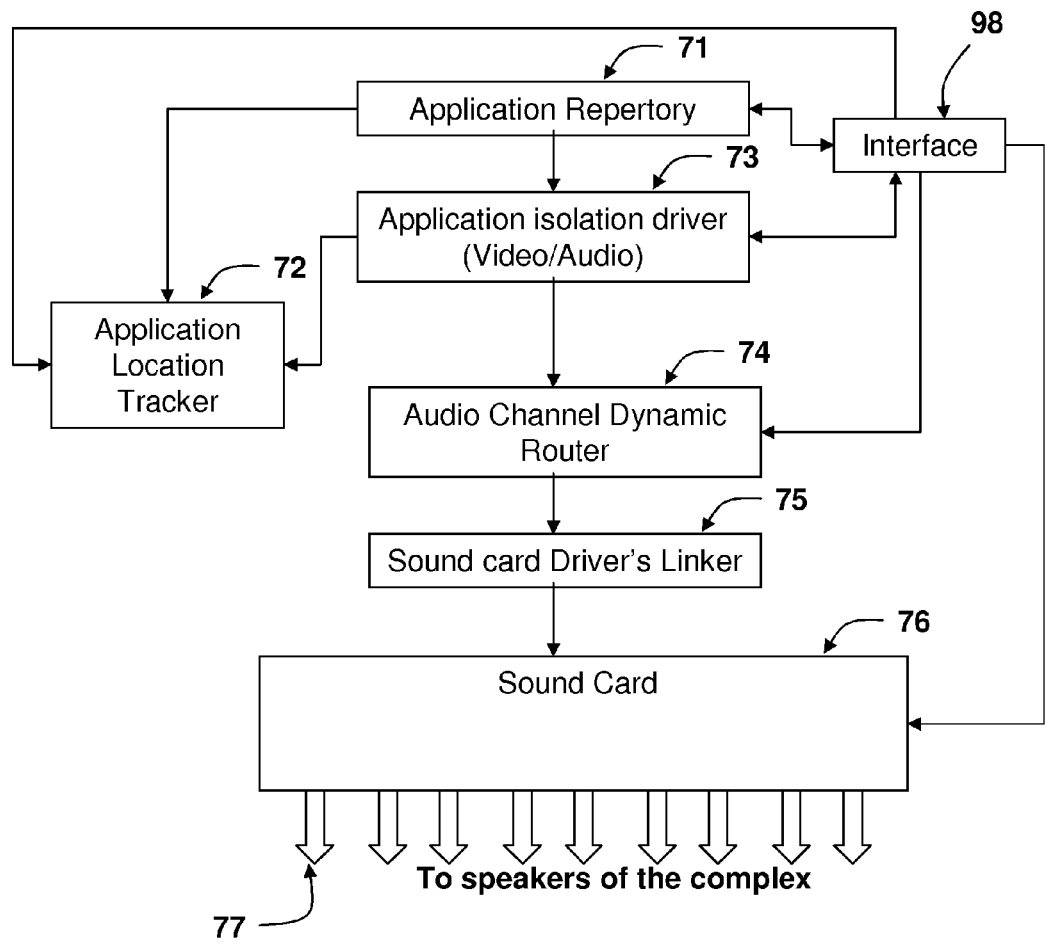
FIG. 12 is a block diagram, schematically illustrating a system for distributing audio signals between multiple speakers located at predefined locations in the complex, according to some embodiments of the invention.

Reference is now made to FIG. 12, which is a block diagram, schematically illustrating a system for distributing audio signals between multiple speakers 77 located at predefined locations associated with the touch screens 100 locations in the complex 2000, according to some embodiments of the invention.

To enable distribution of sound playing through the various speakers 97 installed at various locations in the complex 2000, there is provided a method and a system for distributing audio signals into multiple channels 77, each channel 77 may lead to a different speaker 97 at the complex 2000 located at a side of a different touch screen 100.

According to the embodiments illustrated in FIG. 12, the system for distributing audio signals may comprise:
an interface 98 enabling to operate all applications;
an application repertory 71 operatively associated with the interface 98;
an application location tracker 72, operatively associated with the interface 98 enabling to track the location of the application (meaning which screen should be playing the visuals of the application) 72;
an application isolation driver 73, enabling to isolate each application;
an audio channel dynamic router 74, operatively associated with the interface 98, enabling to associates the speaker(s) 97 to which the audio signals should be transmitted in relation to the identified application location that was tracked;
a sound card driver linker 75 and sound card 76 comprising multiple channels 77, which enable linking the audio signals to the speakers, associating each speaker with a channel 77 and transmitting the audio signals in accordance with the association of the sound signal to the application, which eventually associates the signal with a channel and transmitting the signal therefrom to the associated speaker.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

According to other embodiments of the invention (not shown), the unified input and display system may comprise:
at least one touch screen that enables emitting and guiding any kind of electromagnetic radiation (such as radio frequency (RF) radiation) to enable a user to input drawings by physically interfering the radiation emitted therefrom and displaying of said interference therethrough;
a sensing system comprising a multiplicity of sensors, adapted to sensing the specific electromagnetic radiation emitted at the touch screen (e.g. suitable for sensing radiation in the RF range), wherein the sensors are arranged according to a predefined layout positioned in relation to the touch screen in a manner that allows the sensors to sense interferences in the emitted radiation arriving from the touch screen, made by the user, and translate the sensing into frames each including a pixilated image data of the sensed light; and
a screen unification module enabling to unify frames sensed by the sensors at a given moment into a single screen reading comprising a unified whole-screen pixilated image data.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A display system, comprising:
    an arrangement of optical sensors, positioned behind an at least partially transparent surface such that fields of view of at least two adjacent sensors are partially overlapped;
    a display device, between said arrangement of optical sensors and said surface;
    a light emitting system configured for emitting light outwardly through said surface; and
    a processing unit, configured for analyzing pixelated image data received from said sensors to identify light interferences by objects in front of said surface, controlling said display device based on said analysis, and removing said overlaps by calibrating each optical sensor to ignore light interferences in portions of the respective sensors' field of view that are overlapped by adjacent sensors.

2. The system according to claim 1, wherein said processing unit is configured for determining patterns formed by said objects while being in front of said surface.

3. The system according to claim 1, wherein said processing unit is configured for determining whether said objects touch said surface or hover in front of said surface.

4. The system according to claim 1, wherein said processing unit is configured for determining a distance between an object sensed by said sensors and said surface.

5. The system according to claim 4, wherein said processing unit is configured for determining a spot size generated by at least a few of said objects.

6. The system according to claim 1, wherein said processing unit is configured for determining a number of said objects.

7. The system according to claim 1, wherein said light emitting system comprises a light source configured for directing light into a space between said surface and said display device.

8. The system according to claim 1, wherein said light emitting system comprises a light source behind said display device with respect to said surface.

9. The system according to claim 1, wherein said light emitting system comprises a plurality of light sources entwined between said optical sensors.

10. The system according to claim 1, wherein each optical sensor is a camera defining a plurality of pixels.

11. A combined display system, comprising an arrangement of display systems interconnected by at least one chaining mechanism;
    wherein each display system of said arrangement comprises an arrangement of optical sensors, positioned behind an at least partially transparent surface such that fields of view of at least two adjacent sensors are partially overlapped; a display device, between said arrangement of optical sensors and said surface; and a light emitting system configured for emitting light outwardly through said surface;
    and wherein the combined display system comprises a processing unit, configured for analyzing pixelated image data received from said sensors to identify light interferences by objects in front of respective surfaces, controlling said display devices based on said analysis, and removing said overlaps by calibrating each optical sensor to ignore light interferences in portions of the respective sensors' field of view that are overlapped by adjacent sensors.

12. The combined system of claim 11, further comprising a plurality of speakers configured for receiving signals from a remote application and producing audio sound responsively to said signals, wherein said processing unit is configured for operating said speakers and controlling said displays such as to provide an audio-visual effect moving between displays.

13. A method of controlling a display device, comprising:
emitting light outwardly through an at least partially transparent surface in front said display device;
receiving pixelated image data pertaining to objects being in front of said surface, said receiving being by an arrangement of optical sensors, positioned behind said display device and said surface such that fields of view of at least two adjacent sensors are partially overlapped; and
using a processing unit for analyzing said data to identify light interferences by objects, controlling said display device based on said analysis, and removing said overlaps by calibrating each optical sensor to ignore light interferences in portions of the respective sensors' field of view that are overlapped by adjacent sensors.

14. The method according to claim 13, wherein said analyzing comprises determining patterns formed by said objects while being in front of said surface.

15. The method according to claim 13, wherein said analyzing comprises determining whether said objects touch said surface or hover in front of said surface.

16. The method according to claim 13, wherein said analyzing comprises determining a distance between an object sensed by said sensors and said surface.

17. The method according to claim 13, wherein said analyzing comprises determining a number of said objects.

18. The method according to claim 13, wherein said objects comprises at least one object selected from the group consisting of a finger, a stylus and a longitudinal object other than a finger and a stylus.

19. The method according to claim 13, wherein said sensor are arranged in alternating arrays, and wherein said receiving said pixelated image data is done in a compensating frequency shift among said arrays.

20. The method according to claim 13, wherein said light is near infrared light.

* * * * *